Patented July 27, 1937

2,087,980

UNITED STATES PATENT OFFICE 2,087,980

UREA SYNTHESIS AT PRESSURES ABOVE AUTOGENOUS

Allen E. Lawrence, Wilmington, Del., assignor to E. I. du Pont de Nemours & Company, Wilmington, Del., a corporation of Delaware No Drawing. Application February 2, 1934
Serial No. 709,453

8 Claims. (Cl. 260—125)

This invention relates to the synthesis of urea from ammonia and carbon dioxide or compounds thereof and more particularly to the synthesis of urea at high pressures.

It is known that when ammonia and carbon dioxide, or compounds thereof such as ammonium carbonate, bicarbonate, carbamate and the like are subjected to high temperature in a closed system high pressures are generated and urea is formed. The conversion of reactants to urea is only partial, however, and numerous methods and variations have been suggested whereby the conversions may be increased to approach more nearly to those theoretically possible. These proposals have taken the nature of the utilization of excess ammonia, higher operating temperatures, the separation of unreacted materials from the synthesis melt and recirculation thereof to the autoclaves for further conversion, and the like. Such proposals have been characterized by disadvantages, however, which usually greatly outweigh the advantages obtained by thus accomplishing greater over-all conversion. For example, the employment of higher temperatures progressively magnifies the corrosive attack of reactants and reacted materials upon the apparatus, and the separation and recirculation methods necessitate expenses incident to more extensive apparatus upon which the hot materials may work their corrosive effect.

It is known that excess ammonia will increase conversions, but I have found in a continuous operation, where ammonia and carbon dioxide are conveyed into an autoclave under pressure, that 80% conversion is about the maximum obtainable under practical production rates even though the excess ammonia is varied from 120 to 200% over that stoichiometrically necessary. The employment of large excesses of ammonia, around 150% or more, thus necessitates equipment for removing ammonia without any consequent advantages.

It is an object of this invention to overcome the disadvantages hereinbefore outlined and to provide a new and improved process for the more economical synthesis of urea.

Other objects and advantages of the invention will be apparent by reference to the following specification wherein its details and preferred embodiments are described.

According to this invention urea is synthesized from ammonia and carbon dioxide or compounds thereof, more efficiently and economically than has previously been possible, by causing the above mentioned materials to react in a reaction vessel in which is maintained a pressure above the autogenously developed pressure of the reactant mixture at the reaction temperature. This autogenous pressure has been found to correspond to about 2000–3500 pounds per square inch absolute pressure at practicable urea synthesis temperatures, i. e. 150 to 250° C., varying somewhat in degree as does the temperature.

By raising the rate of through-put of reactants, the conversion of carbon dioxide to urea is decreased due, I believe, to lowering of absorption efficiency of carbon dioxide in the reacting mixture at the autogenous pressure of the latter, caused in turn, in part at least, by the presence of impurities in the usual commercial carbon dioxide gas. Stated in other words, at a given temperature with a given excess of ammonia over the stoichiometrical requirements (commonly employed in urea synthesis), and at a given autogenous pressure, the conversion of ammonia and carbon dioxide to urea varies substantially inversely to the rate of reactant through-put in the autoclaves. I have found that this decline in conversion efficiency may be greatly overcome by utilizing pressures above these autogenously developed in the urea synthesis.

According to this invention, therefore, I am able, by maintaining pressures above autogenous, to increase the rate of through-put at a given temperature, excess of ammonia and rate of conversion or to increase the rate of conversion at a given temperature and given through-put. The benefits of such an advance in the art are obvious.

This invention is generally applicable whatever the conditions of temperature, pressure, rate of through-put, conversion rate, proportions of reactants or excess of ammonia over the stoichiometrical requirements, and the like. Thus, more specifically, and as an illustration only, ammonia and carbon dioxide may be forced into an autoclave in the ratio of 3 to 6 mols of ammonia per mol. of carbon dioxide, at a rate of through-put of from 50 to 300 pounds of total ammonia and carbon dioxide per cubic foot of reaction vessel volume per hour, and the temperature and pressure in said vessel maintained at 150–250° C., and 2600–8000 pounds per square inch absolute, respectively. Even higher temperatures and pressures may be utilized when feasible, and, if desired, greater rates of through-put may be employed in accord with my invention.

An important feature of this invention resides in the maintenance of sufficient pressure to allow accomplishment of the urea synthesis under pressure conditions above those autogenously developed. I succeed in maintaining such elevated pressures by originally injecting the reactants into the autoclave under pressure by means of a piston pump at the elevated pressures at which operation is to be maintained, and thereafter maintaining this or a greater pressure as the urea synthesis reaction proceeds. Any known method for injecting the reactants into the autoclave under elevated pressure may be utilized according to this invention as long as it is possible thereby to instigate and thereafter maintain the higher than autogenous pressures.

The following examples, while not limiting the scope thereof, will serve to illustrate how the invention may be practiced. To facilitate comparison of the effect of varying pressures upon conversion and the like, the examples have been placed in tabular form. The description of procedure according to Example 1, which follows the tabulation, may be applied with variation of quantities, temperatures, pressures, etc., to Examples 2, 3, 4, and 5.

| Example No. | Lbs. melt/ cu. ft. auto- clave vol. hour | Pressure/ lbs. sq. in. | $NH_3$ lbs./hr. | $CO_2$ lbs./hr. | Percent excess $NH_3$ | Percent conversion | Temp. °C. |
|---|---|---|---|---|---|---|---|
| 1 | 117.2 | 4000 | 3000 | 1690 | 130 | 79–80 | 195–205 |
| 2 | 117.2 | 3400 | 3000 | 1690 | 130 | 72–76 | 195–205 |
| 3 | 156.2 | 3800–4000 | 4000 | 2250 | 130 | 72–76 | 195–205 |
| 4 | 156.2 | 4000–4200 | 4000 | 2250 | 130 | 75–77 | 195–205 |
| 5 | 228.2 | 6000 | 5800 | 3330 | 125 | 79 | 205–207 |

Into a pressure resistant vessel were continuously introduced ammonia and carbon dioxide in a ratio corresponding to 130% excess ammonia over the stoichiometrical requirements or 3000 pounds of ammonia and 1690 pounds of carbon dioxide per hour and subjected to a temperature of 195–205° C., and 4000 pounds per square inch absolute pressure. A conversion of reactants to urea of 79–80% was obtained, there being removed from the autoclave 117.2 pounds of urea synthesis melt per hour per cubic foot of autoclave volume.

The advantageous effect of higher than autogenous pressure upon the conversion and rate of through-put will be apparent by comparison of conditions of the examples with one another. Example 1, which is representative of the effect of higher than autogenous pressures, may, furthermore, be correctly compared with a case in which autogenous pressures only are employed. If such pressures (autogenous) are to be maintained substantially under the other conditions of Example 1, it is found that conversions of only 60% are obtained as, for example, under pressure of 2800 pounds per square inch absolute, 100% excess ammonia, and temperature of 195–200° C.

It will be understood that where, in the specification and claims, reference is made to the use of ammonia and carbon dioxide, these terms shall not be taken in their restricted sense only but shall be taken as referring to ammonia and carbon dioxide as such or as compounds of the same.

Various changes may be made in the details and methods of procedure of this invention without departing therefrom or sacrificing any of the advantages thereof.

I claim:

1. In a process of synthesizing urea from ammonia and carbon dioxide at elevated temperatures and pressures, the step which comprises conducting said synthesis at pressures above those autogenously developed and utilizing an excess of ammonia of about 50% to about 200% over the stoichiometrical requirements, the pressures hereinbefore stated being greater than autogenously developed at the particular temperature and excess of ammonia utilized.

2. In a process of synthesizing urea from ammonia and carbon dioxide at elevated temperatures and pressures, the step which comprises conducting said synthesis at temperatures of from about 150 to about 250° C. and at pressures above those autogenously developed and utilizing an excess of ammonia of about 50% to about 200% over the stoichiometrical requirements, the pressures hereinbefore stated being greater than autogenously developed at the particular temperature and excess of ammonia utilized.

3. In a process of synthesizing urea from ammonia and carbon dioxide at elevated temperatures and pressures, the step which comprises conducting said synthesis at temperatures of from about 150 to about 250° C. and at pressures of from about 2600 to about 8000 pounds per square inch absolute and utilizing an excess of ammonia of about 50% to about 200% over the stoichiometrical requirements, the pressures hereinbefore stated being greater than autogenously developed at the particular temperature and excess of ammonia utilized.

4. In a process of synthesizing urea from ammonia and carbon dioxide at elevated temperatures and pressures, the step which comprises conducting said synthesis at temperatures of from about 195 to about 207° C. and at pressures of from about 3400 to about 6000 pounds per square inch absolute and utilizing an excess of ammonia of about 50% to about 200% over the stoichiometrical requirements, the pressures hereinbefore stated being greater than autogenously developed at the particular temperature and excess of ammonia utilized.

5. In a process of synthesizing urea from ammonia and carbon dioxide, the step which comprises conducting said synthesis at temperatures of from about 195 to about 207° C. while utilizing ammonia in the range of about 50% to about 200% excess over the stoichiometrical requirements, and at a pressure of about 6000 pounds per square inch and at a rate of reactant through-put, giving from about 117 to about 228 pounds of synthesis melt per cubic foot of autoclave volume per hour.

6. In a process of synthesizing urea from ammonia and carbon dioxide, the step which comprises conducting said synthesis at temperatures of from about 195 to about 207° C. utilizing ammonia in the range of about 50% to about 200% excess over the stoichiometrical requirements at a pressure of about 6000 pounds per square inch absolute and at a rate of reactant through-put, giving about 228 pounds of synthesis melt per cubic foot of autoclave volume per hour.

7. In a process of synthesizing urea from ammonia and carbon dioxide, the step which comprises conducting said synthesis at temperatures of about 195 to about 207° C., utilizing ammonia in the range about 110% to about 140% excess over the stoichiometrical requirements, at a pressure of about 6000 pounds per square inch absolute and at a rate of reactant through-put, giving from about 117 to about 228 pounds of synthesis melt per cubic foot of autoclave volume per hour.

8. In a process of synthesizing urea from ammonia and carbon dioxide, the step which comprises conducting said synthesis at temperatures of about 195 to about 207° C., utilizing ammonia in the range about 110% to about 140% excess over the stoichiometrical requirements, at a pressure of about 6000 pounds per square inch absolute and at a rate of reactant through-put, giving about 228 pounds of synthesis melt per cubic foot of autoclave volume per hour.

ALLEN E. LAWRENCE.